United States Patent [19]

Jardine

[11] Patent Number: 4,928,521
[45] Date of Patent: May 29, 1990

[54] METHOD OF DETERMINING DRILL BIT WEAR

[75] Inventor: Stuart Jardine, Cambridge, England
[73] Assignee: Schlumberger Technology Corporation, Houston, Tex.
[21] Appl. No.: 328,655
[22] Filed: Mar. 27, 1989

[30] Foreign Application Priority Data

Apr. 5, 1988 [GB] United Kingdom ............... 8807889

[51] Int. Cl.$^5$ .............................................. E21B 47/00
[52] U.S. Cl. ................................................. 73/151; 175/39
[58] Field of Search ................... 73/151, 151.5, 104, 73/659, 660; 175/39

[56] References Cited

U.S. PATENT DOCUMENTS

| Re. 28,436 | 6/1975 | Vitter et al. | 73/151 |
| 2,331,152 | 10/1943 | Willis | 73/51 |
| 2,985,829 | 5/1961 | Swift | 324/70 |
| 3,345,867 | 10/1967 | Arps | 73/151 |
| 3,626,482 | 12/1971 | Quichaud et al. | 175/25 |
| 3,714,822 | 2/1973 | Lutz | 73/104 |
| 4,150,568 | 4/1979 | Berger et al. | 73/151 |
| 4,359,898 | 11/1982 | Tanguy et al. | 73/151 |
| 4,471,663 | 9/1984 | Wallace | 73/862.35 |
| 4,627,276 | 12/1986 | Burgess et al. | 73/151 |
| 4,685,329 | 8/1987 | Burgess | 73/151 |
| 4,773,263 | 9/1988 | Lesage et al. | 73/151 |

FOREIGN PATENT DOCUMENTS

1330191 11/1970 United Kingdom .

OTHER PUBLICATIONS

Bogert et al., "The Quefrequency Analysis . . . Saphe Cracking", Proceedings of Symposium on Time Series Analysis, Wiley, pp. 209–243, 1963.
"Cepstrum Analysis and Gearbox Fault Diagnosis", Application Notes from Equipment Manufacturer Bruel and Kjaer.
SPE Paper No. 16660–"The Effects of Quasi-Random Drill Bit Vibrations Upon Drillstring Dynamic Behavior", by E. Skaugen, Sep. 27–30, 1987, Dallas TX.

Primary Examiner—Michael J. Tokar
Assistant Examiner—Kevin D. O'Shea
Attorney, Agent, or Firm—John J. Ryberg; Stephen L. Borst; Henri Dupont

[57] ABSTRACT

A method is provided for determining the state of wear of a multicone drill bit. Vibrations generated by the working drill bit are detected and converted into a time oscillatory signal from which a frequency spectrum is derived. The periodicity of the frequency spectrum is extracted. The rate of rotation of at least one cone is determined from the periodicity and the state of wear of the drill bit is derived from the rate of cone rotation. The oscillatory signal represents the variation in amplitude of the vertical or torsional force applied to the drill bit. To extract periodicity, a set of harmonics in the frequency spectrum is given prominence by computing the cepstrum of the frequency spectrum or by obtaining an harmonic-enhanced spectrum. The fundamental frequency in the set of harmonics is determined and the rate of cone rotation is derived from the fundamental frequency.

11 Claims, 9 Drawing Sheets

METHOD OF DETERMINING DRILL BIT WEAR

BACKGROUND OF THE INVENTION

The invention relates to the determination of the state of wear of a drill bit which is used at the lower end of a drill string for drilling a hydrocarbon or geothermal well. In particular, the invention relates to a method of determining the state of wear of the drill bit by detecting and analysing the vibrations produced by the drill bit when drilling.

When drilling a borehole in the earth either in the search for hydrocarbons or for geothermal purposes, a drill string comprising drill pipes, drill collars and a drill bit, is rotated from the surface to drill the wellbore. Roller cone bits are widely used. They have cone shaped steel devices called cones that are free to turn as the bit rotates. Most roller cone bits have three cones although some have two and some have four. Each cone has cutting elements which are circumferential rows of teeth extending from each cone. The cutting elements are either steel teeth which are machined as part of the cone or sintered tungsten carbide teeth which are pressed into holes drilled in the cone surfaces. The geometry of a bit, and more particularly of its cones, is such that when the bit is rotated, the cones rotate, the teeth having a combined rolling and gouging action which drills the formation in contact with the drill bit. As the drilling proceeds, teeth are prone to wear. Exceptionally, they may break. The bearings of the cones are also subject to wear.

The length of time that the drill bit can be used before it becomes excessively worn depends on a variety of factors such as the hardness and composition of the rock and the drill string weight that the operator places on the drill bit. The drill bit should be replaced when its rate of penetration has diminished to an unacceptable level or when torque values in rotating the drill string exceed an acceptable limit. The drill bit must also be replaced in case of a tooth break or a cone bearing failure. In order to avoid the cost of retrieving lost cones from the well bore or to avoid drilling with a worn out bit, the drillers tend to pull out the drill string after a certain drilling period although the drill bit is still working satisfactorily. Pulling out the drill string and tripping it in again with a new drill bit is a time consuming and costly operation. In order to maximise the drilling operation, it would be a significant advantage to obtain information regarding tooth wear and cone or tooth failure. With such information each drill bit could be used to the full extent of its useful life.

As teeth bite against the rock one after another, they generate noise or vibration with frequency components determined by the rate at which teeth successively encounter the rock. Various methods have already been proposed to determine the working state of the bit by recording and analysing the vibrations generated by the drill bit.

It is proposed in U.S. Pat. No. 4,773,263 to obtain the frequency spectrum of the vibrational signal, by processing it through a Fourier transform. The frequency spectrum has been found to include various significant peaks which pertain to different tooth rows of the bit. Peak frequencies tend to increase as teeth wear, because the mean rate of rotation of a cutter (normalized relative to bit speed) tends to increase. Therefore the shift of peak frequencies give useful information on wear and hence whether it is yet time to pull out the drill string. Furthermore, abrupt changes in the form of the frequency spectrum are indicative of abrupt occurrences at the bit such as loss of a tooth. This may lead to the appearance of a new peak as an unbroken tooth is forced to take over the work previously done by the broken tooth. Loss of frequency peaks indicate that a wheel has stuck or is clogged by a ductile rock. However, the success of the method is limited to instances where it is possible to track the position of specific spectral peaks.

In accordance with another method described in U.S. Pat. No. 3,714,822, the extent of wear of the drilling bit is determined by selecting at least one frequency band in the vibration spectrum and by measuring the average amplitude of the signal in the frequency band. In one embodiment, one frequency band is selected centred on the second harmonic of the maximum amplitude frequency and a second band is selected which is centred on the frequency between the second and third harmonic. The ratio between the average amplitudes of the vibrations in these bands is calculated, a ratio of more than two showing that the tool is new and a ratio of about one showing that it is worn.

U.S. Reissue Pat. No. 28,436 relates to a method of determining bit damage by monitoring at the surface the rotary torque of the drill string for characteristic oscillations, the oscillations having a frequency not more than twice and not less than half the expected frequency of torsional oscillations of the drill string. In addition, the monitored oscillations have an amplitude in excess of the amplitude of any oscillations produced by rotation of an undamaged bit.

U.S. Pat. No. 2,985,829 relates to a method of determining the rate of bit rotation by detecting and interpreting vibrations at the surface. By demodulating and filtering the vibration signals, most of the frequency components (and therefore harmonics) different from the bit frequency are eliminated. In addition, the described system is based on the wrong assumption that there is a fixed relation between the speed of a bit and associated roller cones.

The above described techniques have not given full satisfactory results. Therefore a need exists for a method to detect the working conditions of a drill bit, the wear of its teeth or of a cone bearing or a tooth break.

SUMMARY OF THE INVENTION

Accordingly, the present invention proposes a method of determining the state of wear of a multicone drill bit fixed at the lower end of a drill string for drilling a borehole in the earth, wherein vibrations generated by the working drill bit are detected and converted into a time oscillatory signal from which a frequency spectrum is derived, the periodicity of the frequency spectrum is extracted, the rate of rotation of at least one cone is determined from said periodicity and the state of wear of the drill bit is derived from said rate of cone rotation. The frequency spectrum is advantageously normalized relative to the rate of bit rotation. The oscillatory signal represents the variation in amplitude of the vertical or torsional force applied to the drill bit. The frequency or frequencies generated by the pump injecting drilling mud into the drill string is or are advantageously detected and removed from the frequency spectrum. For that purpose, the mud pressure variations are detected and converted into a pressure signal from which a frequency spectrum is derived, the frequency or frequencies generated by the pump are identified and the frequency spectrum of the vibration oscillatory signal is filtered so as to remove said frequency or frequencies.

In accordance with one embodiment, the range of possible rates of cone rotation is determined relative to the rate of bit rotation, the peak of highest amplitude in the frequency spectrum is identified within said range and the rate of cone rotation is determined from said peak position in the spectrum.

In accordance with a further embodiment, a set of harmonics in the frequency spectrum is given prominence by determining the fundamental frequency in the set of harmonics and the rate of cone rotation is derived from said fundamental frequency. The cepstrum of the frequency spectrum can be computed, the peak of maximum amplitude selected from the cepstrum and the rate of cone rotation derived from the position of said peak in the cepstrum. Alternatively, compressed spectra are obtained by compressing the frequency axis of the frequency spectra by integer values, the compressed spectra are multiplied together so as to obtain an harmonic-enhanced spectrum, the fundamental frequency of said harmonic-enhanced spectrum is determined and the rate of cone rotation is derived from said fundamental frequency.

BRIEF DESCRIPTION OF THE DRAWINGS

The invention will be more fully described with reference to the accompanying drawings, in which:

FIG. 8 shows a comparison of original (FIG. 8a) and harmonically enhanced (FIG. 8b) spectra obtained from the drilling machine of FIG. 2 for a worn bit.

DESCRIPTION OF THE PREFERRED EMBODIMENT

Figure 1:
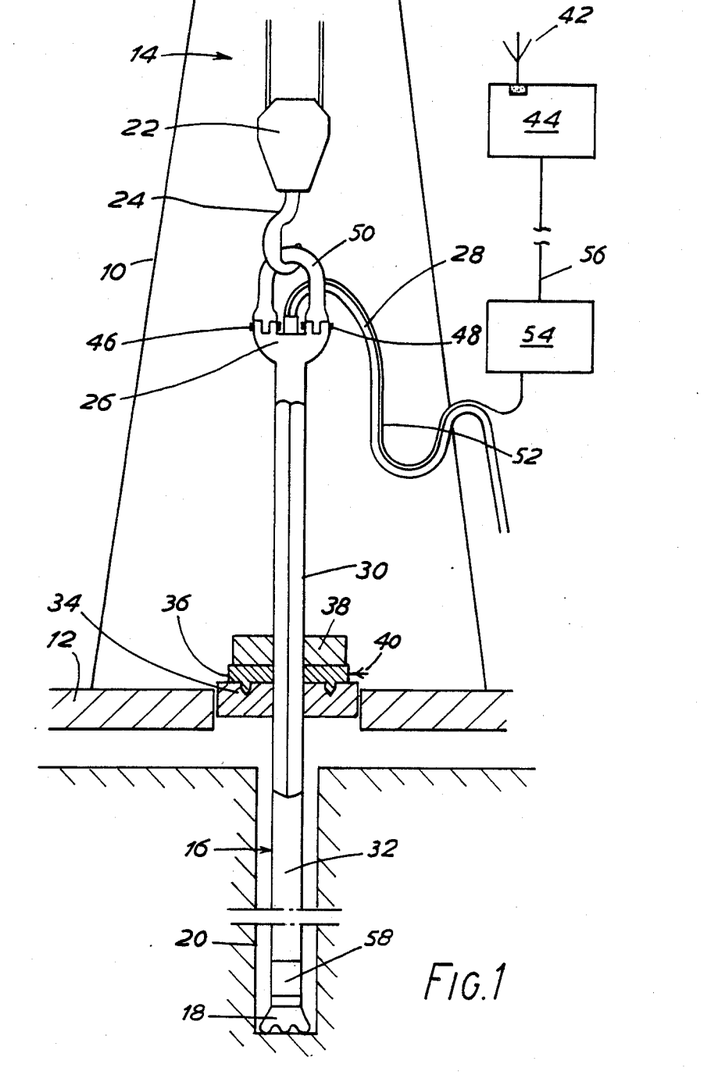
FIG. 1 shows schematically the equipment used at the surface on a drilling rig to detect and interpret the vibrations generated by the drill bit downhole.

FIG. 1 is a schematic view of the equipment which can be used to measure vibrations on an oil drilling rig. The derrick shown in FIG. 1 comprising a mast 10 standing on the rig floor 12 and equipped with a lifting system 14, on which is suspended a drill string 16 carrying at its lower end a drill bit 18 for drilling a well 20. The lifting system 14 comprises a crown block (not represented) fixed to the top of the mast 10 and a vertically mobile travelling block 22 to which is attached a hook 24. The drill string 16 can be suspended on hook 24 via an injection head 26 connected by a flexible hose 28 to a mud pump which makes it possible to circulate into the well 20 a drilling mud from a mud pit. The drill string 16 comprises a driving rod 30, or kelly, and is formed from pipes 32 joined end to end by screwing. The drill string is rotated by the rotary table 34. The vibration signals generated by the drill bit 18 can be detected either at the surface or downhole. When the detection is made at the surface, the equipment comprises a torque meter 36 fixed between the rotary table 34 and the kelly bushing 38. Torque meter 36 measures the torsional force, or torque (TOR), applied to the drill string 16. It comprises an antenna 40 to transmit the torque signal to a receiving antenna 42 of a data acquisition and processing system 44. The torque meter 36 is preferably of the type described in U.S. Pat. No. 4,471,663. The vertical force applied on the drill string, or weight on bit (WOB), is measured by two load pins 46 and 48 fixing together the injection head 26 to the hook 50, itself hung on the hook 24. The load pins comprise strain gauges which are connected by the electrical cable 52 to a junction box 54 which is itself connected to the data acquisition and processing unit 44 via a cable 56. These load pins and the torque meter are commercially available. Accelerometers could also be used in addition to the torque meter and load pins, in order to measure accelerations on the torque meter and injection head.

When the vibration signals are detected downhole, for example in a measurement while drilling (MWD) operation, a sub 58 is located downhole on top of the drill bit 18 in the MWD tool. The sub 58 comprises sensors to measure the torque and weight on bit applied to the drill bit 18. Such a sub is, for example, described in U.S. Pat. No. 4,359,898 and is used commercially by the company Anadrill of Sugar Land (Texas).

Figure 2:
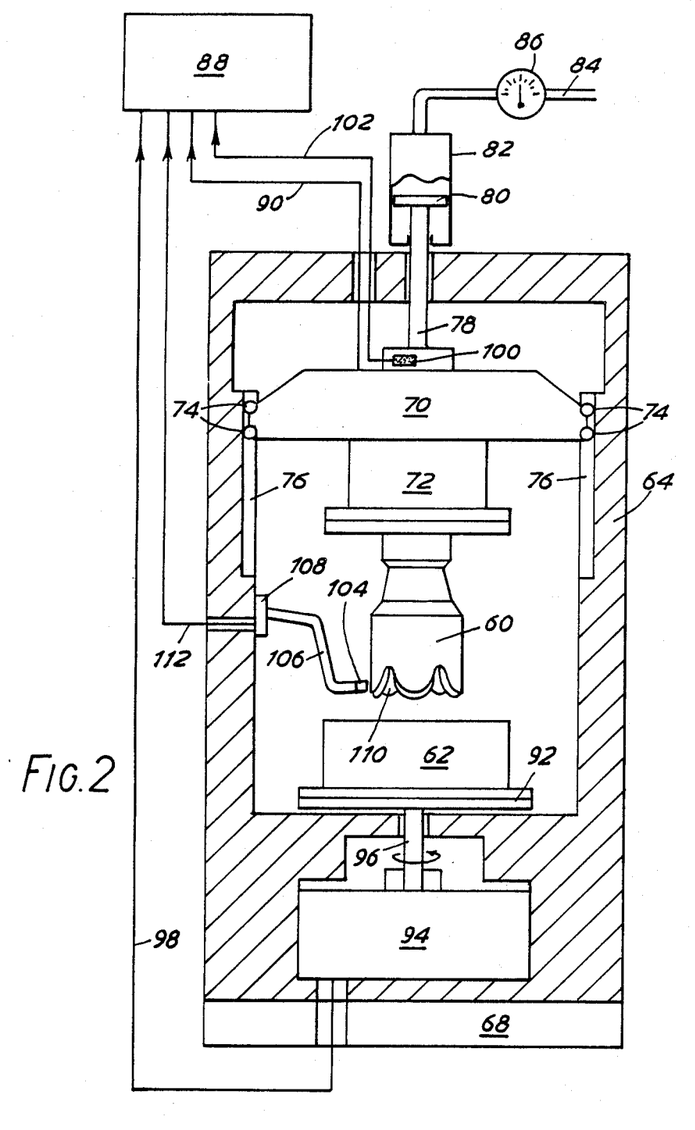
FIG. 2 is an elevational view of the equipment used in the laboratory to detect and measure vibrations generated by a drill bit drilling a rock sample.

FIG. 2 is a schematic representation of the drilling machine used in a laboratory to measure vibrations induced by a bit 60 drilling a rock sample 62. The drilling machine comprising a frame 64 with a base 68. On this machine, the rock sample 62 rotates instead of the drill bit 60 which is fixed in rotation. The drill bit 60 can move vertically and a variable weight on bit can be applied. The bit is fixed to a bit sub 70 via a load cell 72. The bit sub 70 can move with respect to the frame 64 of the machine but cannot rotate. It comprises bearings 74 which can slide into two diametrically opposed guiding rails 76. The bit sub, and therefore the bit, is moved vertically by a driving member 78 connected to the bit sub 70. The driving member 78 is fixed to one side of piston 80 moving into a piston cylinder 82. On the other side of piston 80, a variable pressure is applied by an oil injection through a pipe 84 connected to a pump (not represented). A pressure gauge 86 indicates the oil pressure applied on piston 80. The weight on bit or vertical force applied by the drill bit on the rock sample surface is determined in the load cell 72 by strain gauges. The signals emitted by the load cell are transmitted to a data acquisition and processing system 88, for example the GenRad model 2515 system, by an electrical cable 90. The rock sample 62 is attached on a platform 92 driven in rotation by an electrical motor 94 coupled to the platform 92 by a shaft 96. The rotation speed of the rock sample is measured and a corresponding signal is sent to the data acquisition and processing system 88 by a cable 98. The torque transmitted to the drill bit 60 by the rotation of the rock sample 62 is detected by a strain gauge 100 fixed on top of the bit sub 70. The torque signal is transmitted to the system 88 by an electric cable 102. The drilling machine comprises also a proximity detector 104 attached to one extremity of an arm 106, the other extremity of which being fixed on the frame of the machine at 180. The proximity detector 104 detects the position in rotation of the cone 110 of the drill bit. The signal representing the angular position of cone 110 is transmitted to the system 88 via a cable 112. Two other proximity detectors (not represented) detect the angular position of the two other cones of the bit.

An instrumented three-cone bit, especially built, can also be used instead of a commercial bit. The tooth-rows of one of the cones are mechanically uncoupled and strain gauges are located on the bit so as to detect the vibrations produced by the outside or heel tooth-row of the cone. The strain gauges were connected to the data acquisition and processing system 88.

For a good understanding of the invention, it is useful to give herebelow a few indications about the Fourier transform of a periodic function and its frequency spectrum, more especially its power spectrum.

Any periodic function y(t) of period T can be expanded into the time Fourier series (in complex form):

$$y(t) = (1/T) \text{Sigma} [C_n e^{i\omega_n t}] \quad (1)$$

"Sigma" representing the sum from $n = -\infty$ to $n = +\infty$. The parameter $\omega_n$ is the angular frequencies $\omega_n = 2n\pi/T$ with $\pi = 3.14159$, $\omega$ being the fundamental angular frequency and $\omega_n$ from $n = 2$ representing its harmonics. The $C_n$ are the Fourier coefficients and are obtained by the integral from $t = -T/2$ to $t = +T/2$ of the expression $y(t)e^{(-i\omega_n t)}dt$.

To obtain the frequency spectrum which would be generated by the time series (1), Fourier transforms are taken term by term. For the $n^{th}$ term the following transform pair applies:

$$e^{i\omega_n t} \longleftrightarrow 2\pi \Delta(\omega - \omega_n)$$

where $\Delta(\omega - \omega_n n)$ is the delta or Dirac function which is non-zero only at $\omega = \omega_n$.

The Fourier transform of (1), $F(\omega)$, is then given by:

$$F(\omega) = (2\pi/T) \text{Sigma} [C_n \Delta(\omega - \omega_n)] \quad (2)$$

Any periodic signal y(t) may therefore be represented by a discrete spectrum Fourier transform $F(\omega)$ consisting of impulses weighted by the Fourier coefficients $C_n$ at the harmonics $\omega_n$ of the periodic signal. In terms of the frequency spectrum obtained from a drill bit vibration signal, such as WOB or TOR signal, variation in individual tooth contribution and tooth spacing on one or more cones can contribute to many of the cone rotation speed harmonics. The special case of equal tooth contribution within a specific tooth-row causes a tooth-row harmonic to produce a large contribution to the vibration signal.

It is convenient, instead of using the Fourier transform $F(\omega)$, to consider the power spectrum P of the signal, defined by:

$$P = [F(\omega).F(\omega)^*]/T_o$$

$F(\omega)^*$ being the conjugate function of $F(\omega)$. Expressed in other terms, P is the square of the modulus of $F(\omega)$ divided by the acquisition time interval $T_o$.

To obtain a bit spectrum $F(\omega)$ which is independent of the bit rotation speed, the spectrum is normalized by adjusting the frequency increment $(f_n - f_{n-1})$ so that peak positions are equivalent to that obtained at one bit revolution per second or one Hertz. Mathematically:

$$F\text{Norm} = F(\omega, f_{bit}) \text{ where the bit frequency}$$
$$f_{bit} = \omega \text{bit}/2\omega.$$

Applied to equation (2), peaks are therefore produced at $\omega = \omega_n/f_{bit}$. The 'normalized frequency' is dimensionless and represents the spectrum which is obtained at a bit rotation rate of one revolution per second (1 Hz). This ensures that the cone speed estimate is independent of the bit rotation speed.

Figure 3A:
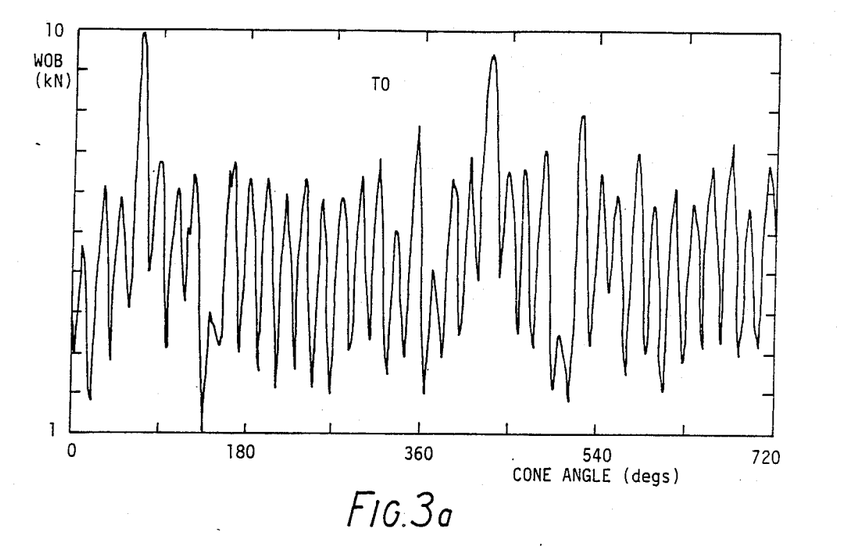
FIG. 3 is a plot showing the vertical force on the 19-toothed row as a function of angle for cone 3 of a drill bit for a new and a partially worn cone.
Figure 3B:
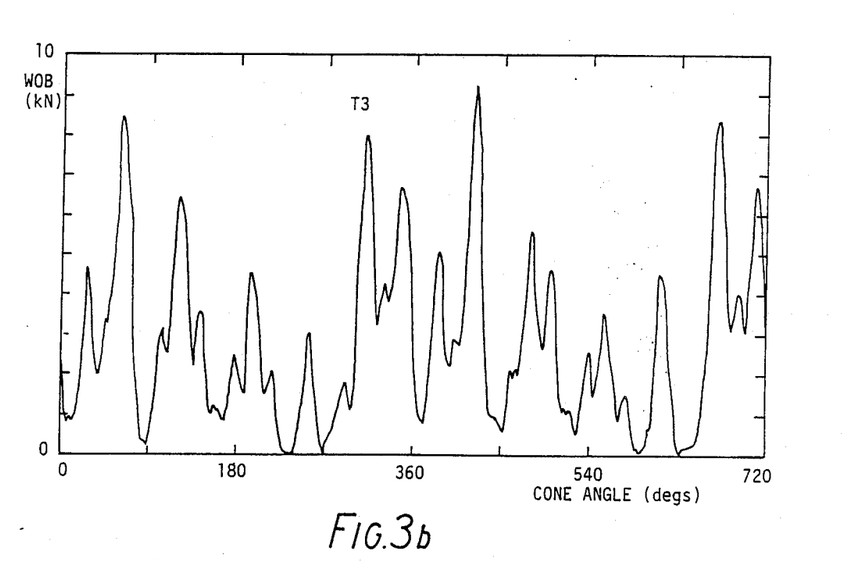

To illustrate the important features observed in the vibration signature measured above a working drill bit, it is instructive to consider the vertical force or weight-on-bit (WOB) acting on a single tooth-row of a three-cone drill bit as shown in FIGS. 3. This represents the contribution to the WOB vibration signal from the 19-toothed heel row of one cone only as measured using the drilling machine shown on FIG. 2 and the instrumented three-cone bit. FIGS. 3 show the WOB measured in kN as a function of the angle of the instrumented cone 110 measured by a shaft encoder incorporated into the instrumented bit for a new bit TO (FIG. 3a) and a partially worn bit T3 (FIG. 3b) over two cone revolutions. This result is averaged over 15 data sets. It is the practice in the drilling industry to indicate the state of wear of a drill bit by the letter "T" followed by a number from 0 to 8 indicating the length of the teeth measured in 8th: T0, T3 and T8 for example indicate a zero wear bit (TO), a ⅜th worn bit (T3) and a worn out bit (T8), respectively. It is apparent from FIG. 3a and 3b that the WOB data repeats every cone revolution. There are 19 peaks per cone revolution on FIG. 3a, each corresponding to one tooth (the cone investigated having 19 teeth). However, for a worn bit, all the teeth do not contribute anymore to the signal as shown in FIG. 3b: there is a change in the WOB distribution causing a reduction in the number of "effective" teeth contributing significantly to the WOB signal. The periodic contributions are different in FIG. 3a and 3b.

Figure 4A:
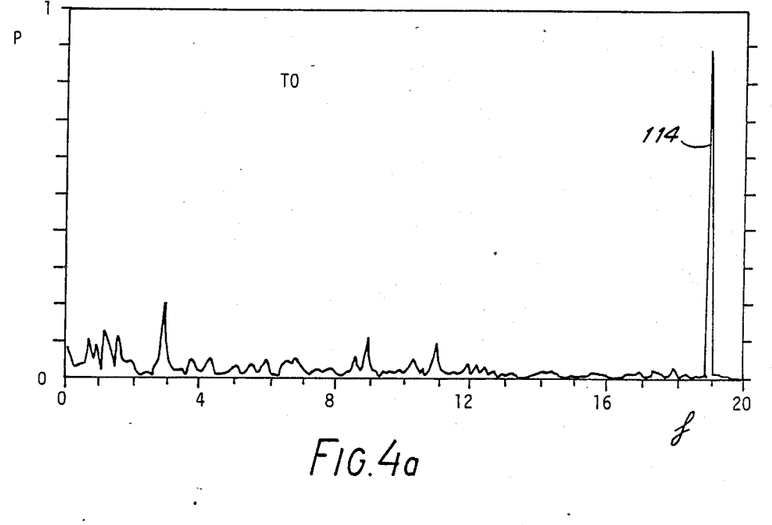
FIG. 4 shows the power spectra normalized to the cone rotation rate obtained from FIG. 3 data.
Figure 4B:
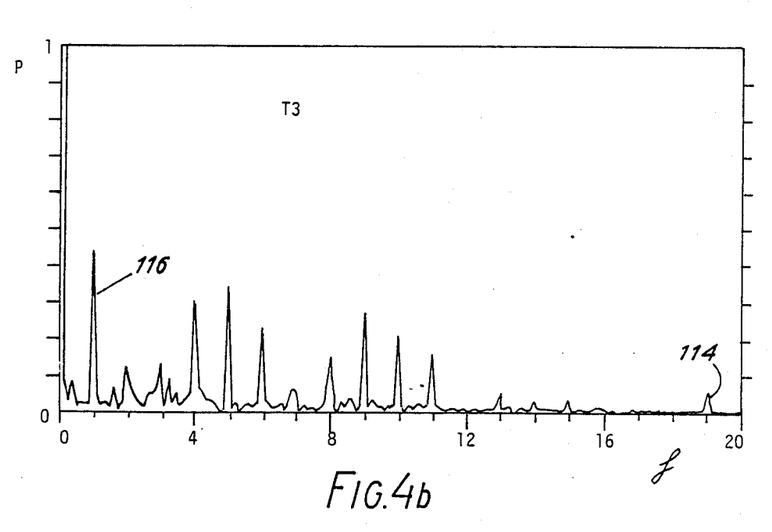

FIGS. 4a and 4b are the power spectra P (in kN2) of the time domain data used to produce FIG. 3a and 3b respectively. As previously indicated the power spectra are expressed in the frequency domain. The data is sampled as a function of cone angle so the frequency axis f in FIG. 4 is effectively normalized to the cone rotation rate. The cone frequency is therefore equal to 1 and a peak at say, 10 Hz, represents a contribution at 10 times the cone speed. The dominant contribution to FIG. 4a is peak 114 which is the tooth-row frequency at 19 times the cone frequency. This was expected since the cone row investigated had 19 teeth equally spaced. However FIG. 4b shows that, at the higher wear state T3, many peaks are produced at lower frequency than the frequency of peak 114, the amplitude of which having decreased quite substantially. It is realized, when comparing FIG. 4a and 4b that the methods proposed in the prior art, consisting in monitoring the amplitude of the vibration signal in one or several frequency bands or consisting in detecting the shift of one peak or peaks in the frequency spectrum, are difficult to implement in practice. In FIG. 4b, peak 116 corresponds to the cone fundamental frequency (n=1) while the other dominant peaks correspond to harmonics (n=2, 3, 4, . . . , 19) of the cone frequency.

The harmonics arise from the non-uniform tooth contributions shown in FIG. 3b. These peaks are a general feature of spectra obtained from a repetitive signal FIG. 4a is a special case where the tooth-row harmonic (peak 114) is the dominant Fourier component due to comparatively uniform tooth contribution. This dominant component disappears, as illustrated in FIG. 4b when the drill bit wears.

The single tooth-row data described above is a useful illustration of the nature of the complete bit signature which is detected above a working bit.

The bit frequency signatures detected on the drilling machine of FIG. 2 will now be described for a new and worn three-cone bit with reference to the power spectra shown in FIG. 5a and 5b respectively.

Figure 5A:
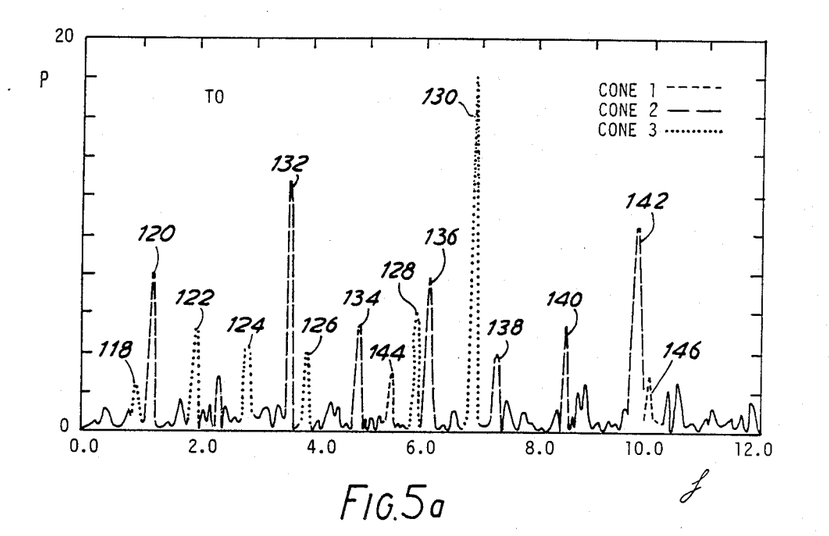
FIG. 5 shows plots of the weight on bit power spectra for a new and a worn bit.

FIG. 5a shows a typical power spectrum P obtained from the WOB fluctuations measured above a new bit drilling limestone. The spectrum is obtained from data recorded over 16 bit revolutions. When dealing with whole bit signatures, it is generally required that the spectral of the bit signature is independent of bit rotation speed. The power spectra have therefore been normalized to the bit rotation frequency as described previously. Peaks positioned at cone speeds and their harmonics are indicated with short dashed lines for cone 1, with long dashed lines for cone 2 and with dots for cone 3. These spectral peaks arise from the complicated (but periodic) force fluctuations produced by the cutter wheels. The rotational speed of each cone (different from one cone to another) was measured with the proximity detectors 104. From these measurements the position of each cone frequency was determined and normalized to the bit rotation speed so as to identify them on FIG. 5. They correspond to peaks 118 and 120 for cone 3 and 2 respectively on FIG. 5a. There is no peak corresponding to the rotation speed of cone 1. Peaks 122 to 130 correspond to harmonics of peak 118 and peaks 132 to 142 correspond to harmonics of peak 120. Harmonics of cone-1 frequency are indicated by peaks 144 and 146.

Figure 5B:
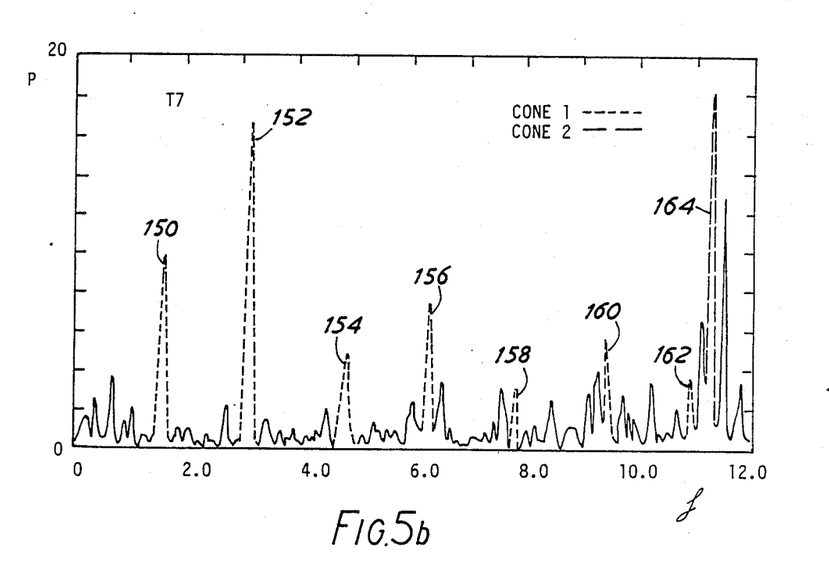

In FIG. 5b, for a bit worn at T7, cone 1 contributes substantially to the power spectrum by peaks 150 to 162. Cone 3 does not contribute anymore and cone 2 contributes only with peak 164. It has been noted that, as the cones wear, their rotation speeds tend to be the same. Again, it is obvious from FIG. 5, that the methods of the prior art would be very difficult to implement. FIG. 5 shows that the periodic features are frequently enhanced by the wear process and this characteristic is advantageously used, in accordance with the present invention, in the algorithms described hereafter to determine cone speed without identifying tooth-row frequencies. Even for the new bit spectrum shown in FIG. 5a, non-tooth-row harmonics arise from the interaction between tooth-rows, non-uniform cutter spacing and variation in cutter geometry. These effects all aid cone speed (and hence wear) determination by giving prominence to sets of harmonics, in accordance with the present invention.

When determining the cone speeds, account is taken of the fact that the range of possible bit normalized cone speeds is known for normal drilling operation (with cones with correctly functioning bearings, but in any wear state): the cone speeds are typically between 0.9 and 1.8 of the bit speed. In addition, a certain amount of result averaging is used to ensure a valid estimate of T-value, particularly as wear progresses slowly relative to the required processing time. Furthermore, as many cones as possible are identified.

Figure 6:
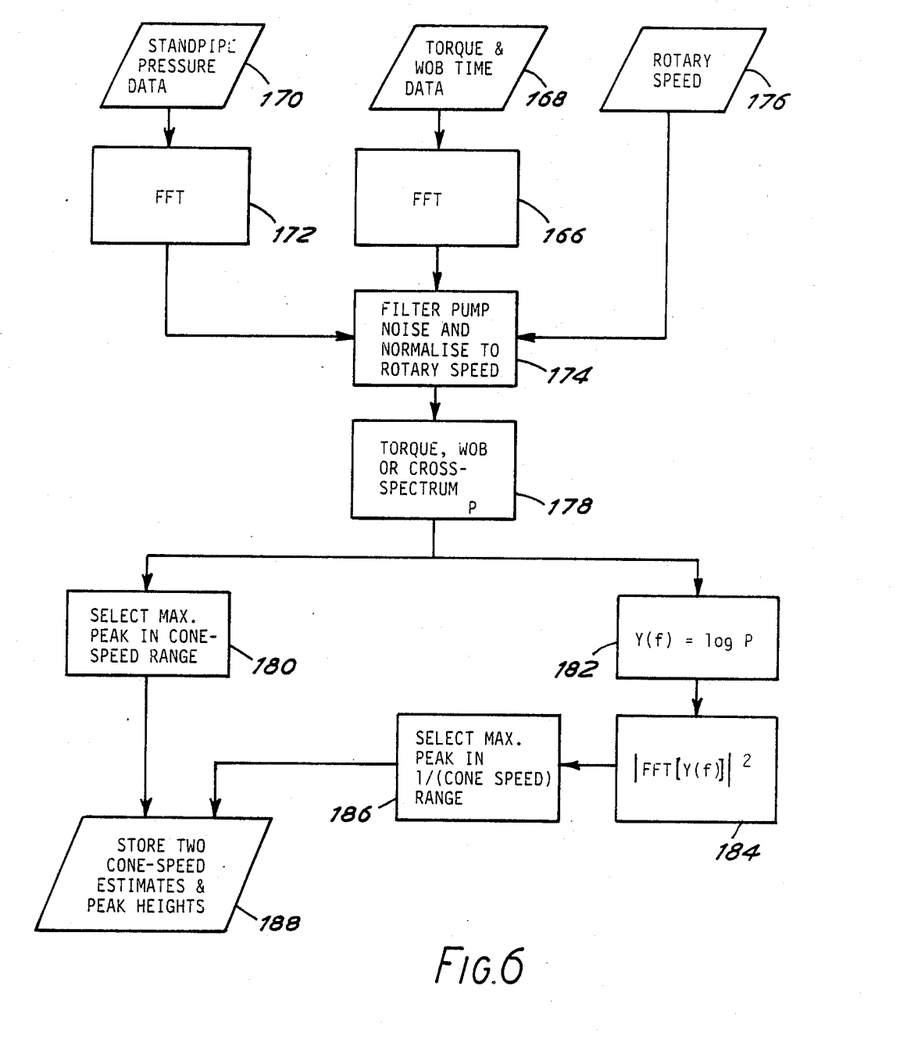
FIG. 6 is a flow chart for a cone speed bit wear diagnostic.

A technique, in accordance with the present invention, for processing data which enhances the periodic nature of cone signatures to determine bit wear state is illustrated in FIG. 6 under the form of a flow chart. Data are processed with the data acquisition and processing system 88 (FIG. 2) or 44 (FIG. 1). This system could be a general purpose computer able to perform the tasks indicated in the flow chart. Power spectra are generated using a fast Fourier transform (FFT) routine (166), from the torque (TOR) and weight-on-bit (WOB) data (168). Mud pump effects are cancelled by eliminating from the bit spectra the frequency or frequencies of the vibrations generated by the pump. For that purpose, data representing the stand pipe pressure (in pipe 28 on FIG. 1) are recorded (170) and the power spectrum is computed using a FFT (172). The WOB and TOR spectra are normalized to the bit rotation speed (174) using the rotary speed calibration (176). The spectrum P to be analyzed can consist of either of the individual TOR or WOB channel or the cross-spectrum which emphasizes features common to both signals (178). In order to exploit the periodic nature of the cone signatures to identify cone speeds, a two part diagnostic is preferably applied to the normalized spectrum:

(a) The strongest peak is identified (180) within the known cone-rotation speed range (0.9 to 1.8 normalized Hz). The spectral position of this peak is taken as the repetition frequency of a dominant cone signature and is therefore a direct measure of cone-rotation speed. However, when the strongest peak cannot be identified, only following part (b) is implemented.

(b) To measure the dominant harmonic spacing in the power spectrum in order to extract periodicity produced by cone signatures, a "power cepstrum" analysis is applied to the data. The cepstrum is generated by computing the logarithm Y(f) of the power spectrum P (182) and by computing (184) the power spectrum of Y(f). The computation of cepstra is described in "Proceedings of Symposium on Time Series Analysis", Wiley, pp 209–243, 1963, by B. P. Bogert et al. The logarithm has the effect of desensitizing the cepstrum output to the amplitudes of the various harmonics. This effect becomes additive in the cepstrum due to the additive property of the logarithm. Again the knowledge of normalized cone speed range is included (186) by selecting the position of the peak of maximum amplitude only within the inverse cone speed range. This peak position is an estimate of the dominant harmonic spacing in the spectrum and so should again be a measure of cone speed.

Then the two cone-speed estimates are stored (188). The next vibration signals corresponding to the next data acquisition periods are then processed in the same way so as to produce successive values corresponding to a period of time during which the state of bit wear has not changed significantly. The values are averaged to produce a mean value of the cone rotation speed which is sent to the surface in the case of a MWD operation. The mean value is stored or displayed at the surface so as to monitor the variation of cone rotation speeds during the drilling process.

Figure 7A:
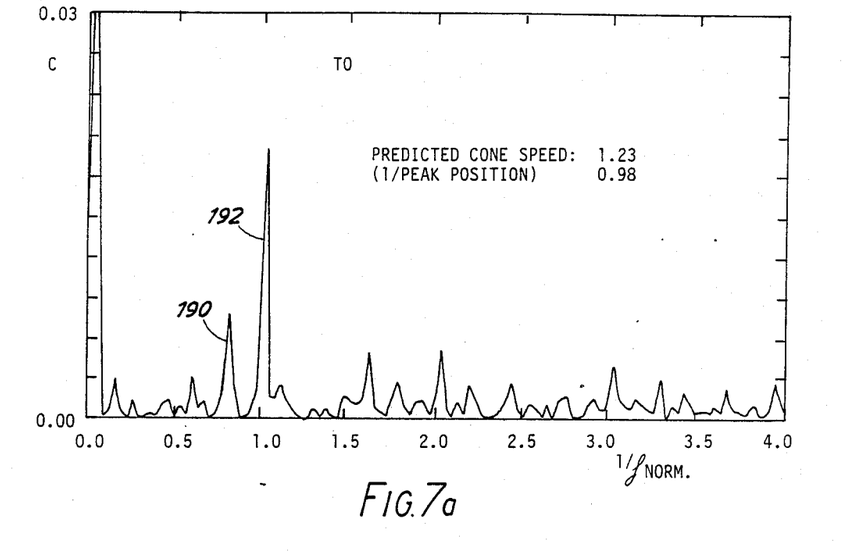
FIG. 7 are cepstra derived from the power spectra shown in FIG. 5.
Figure 7B:
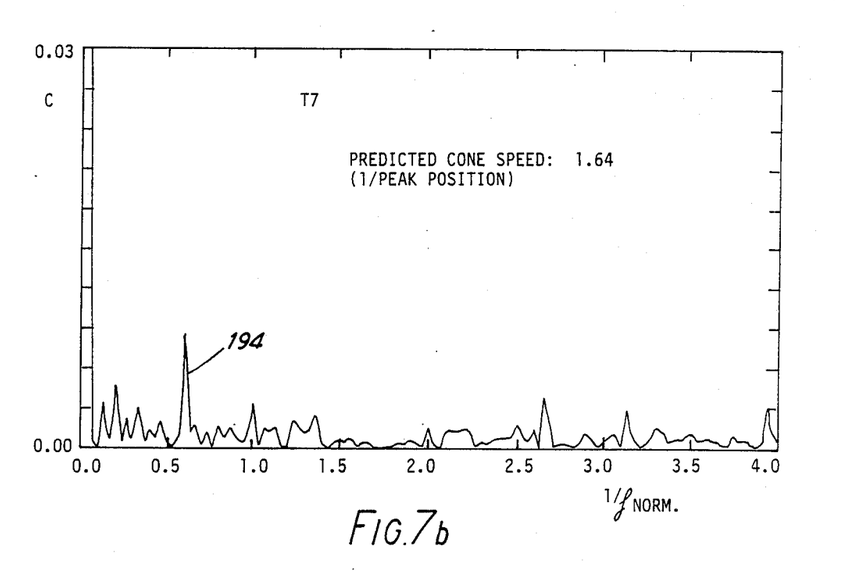

The two-part diagnostic allows a means of data reduction whereby only data where the outputs agreed to within tolerable limits are accepted. In this way sections of data which do not show strong harmonic cone-rotation speed behaviour are rejected. In practice it was found that nearly all the acquired data could be used in the cone-rotation speed estimate with only minimal smoothing to reject values with high deviation from the mean values. Both parts of the diagnostic were therefore retained to give independent cone speed estimates and the possibility of obtaining more than one cone-rotation speed. This is illustrated in FIG. 7a and 7b which show the cepstra C derived from the power spectra of FIG. 5. The cepstra are given as a function of 1/f, the inverse of the bit-normalized frequency.

FIG. 7a (corresponding to wear state T0) shows two distinct peaks 190 and 192 within the cone frequency range corresponding to the periodic effects from the two cones 2 and 3 which contribute to the spectrum of FIG. 5a. FIG. 7b (corresponding to wear state T7) shows only one dominant peak 194 corresponding to one periodicity in the spectrum of FIG. 5b. This situation is likely to arise where only one cone (cone 1) gives a strongly periodic contribution during the data acquisition or where all the cone-rotation speeds are similar.

The dominant peak 192 in FIG. 7a is from cone 2 and is not from cone 3 which produces the strongest peak in the cone-speed range of FIG. 5a as cone 1 produces the strongest harmonic generation effect. The spectrum and cepstrum results therefore obtain cone-rotation speeds from different cones in this case.

The diagnostic outputs for this data can be summarised as follows and, since the data was obtained on the laboratory drilling machine of FIG. 2, can be compared with actual cone-speeds as measured using proximity transducers 104.

For wear state T0
  Spectrum diagnostic (FIG. 5a)=1.23
  Cepstrum diagnostic (FIG. 7a)=0.98
  Actual cone speeds=0.98, 1.21, 1.09.
For wear state T7
  Spectrum diagnostic (FIG. 5b)=1.58
  Cepstrum diagnostic (FIG. 7b)=1.64
  Actual cone speeds=1.57, 1.43, 1.54.

For the new bit (T0) the two diagnostics detect two different cones, as shown previously. In the case of the worn bit, the two diagnostics agree to within the spectral resolution of 0.0625 normalized Hz. In both cases the diagnostic outputs agree with one or more cone speeds and the cone speed increase of around 40% between the wear extremes is readily detected.

The cepstrum technique is by no means the only possibility for obtaining cone speed information from spectral estimates. Any other method which is sensitive to the global spectral contribution of specific cones and which measures the dominant periodicity in the spectrum can be used.

One such technique is to not only normalize the spectrum to the bit rotation rate, but also to obtain versions of the original spectrum which are normalized to integer multiples of the bit rotation. This only requires compression of the frequency axis by integer values (1, 2, 3, etc . . . ) and then the compressed spectra are then multiplied together. For a continuous bit normalized power spectrum $P(\omega)$, the enhanced spectrum $E(\omega)$ can be stated mathematically as: $E(\omega)$=Product of $P(k\omega)$, from k=1 to k=K, where K is the number of compressed spectra multiplied together.

Figure 8A:
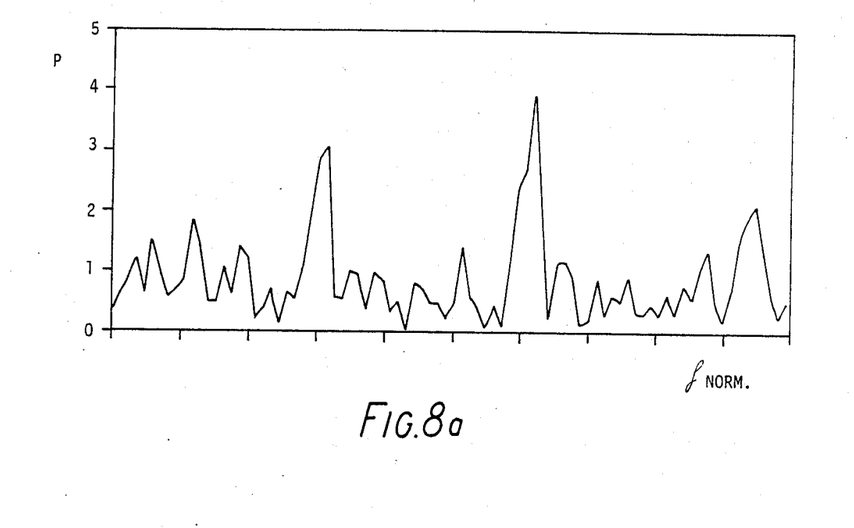
Figure 8B:
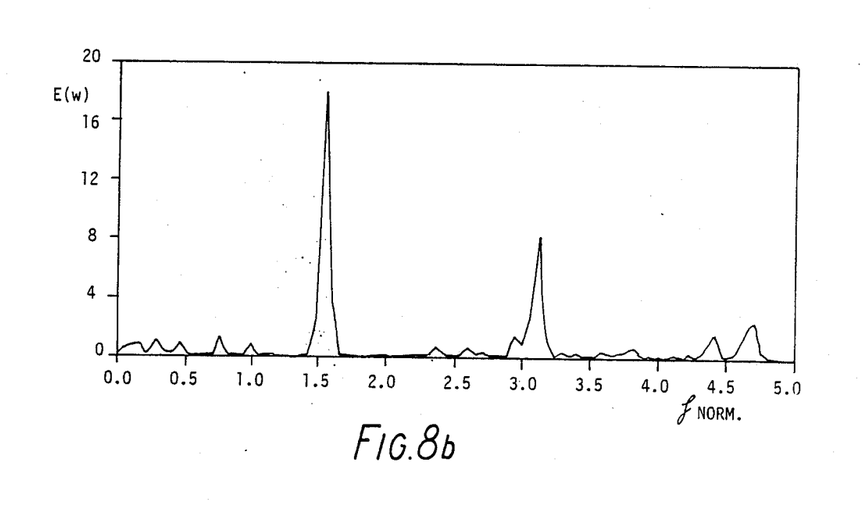

The Harmonics of the fundamental cone frequency coincide to reinforce the fundamental peak. This is depicted in FIG. 8 for the original (K=1) spectrum obtained from a worn bit (FIG. 8a) and the harmonically enhanced spectrum $E(\omega)$ (K=4) shown in FIG. 8b. Peaks which are not harmonically related do not reinforce constructively and the result is a clear improvement in the signal to noise ratio of the harmonically related component. This enhancement technique is, for example, described in Proc. Symp. Computer Processing in Communications, pp 779–798, April 1969. This technique may have computational advantages over the cepstrum, particularly if 'K', the harmonic order of interest, is small. In the flow chart of FIG. 6, when this technique is used, the cepstrum determination indicated by references 182 and 184 is replaced by the computation of the enhanced spectrum $E(\omega)$. The peak of maximum amplitude (reference 186) is then selected within the range of possible cone rotation speeds and averaged (over about 20 data samples).

With discrete spectra, there is obviously no longer a one to one correspondence in the number of points per unit frequency between the compressed spectra (since the frequency axis has been compressed by a factor of 2, 3, . . . , k, . . . K). It is therefore necessary to rectify this prior to multiplication by either summing over the requisite number of points in the compressed spectra or interpolating in the less compressed versions.

The optimum processing technique to be used in order to enhance the periodic information in the spectrum depends to a large extent on the nature of field data and the available processing power.

Figure 9:
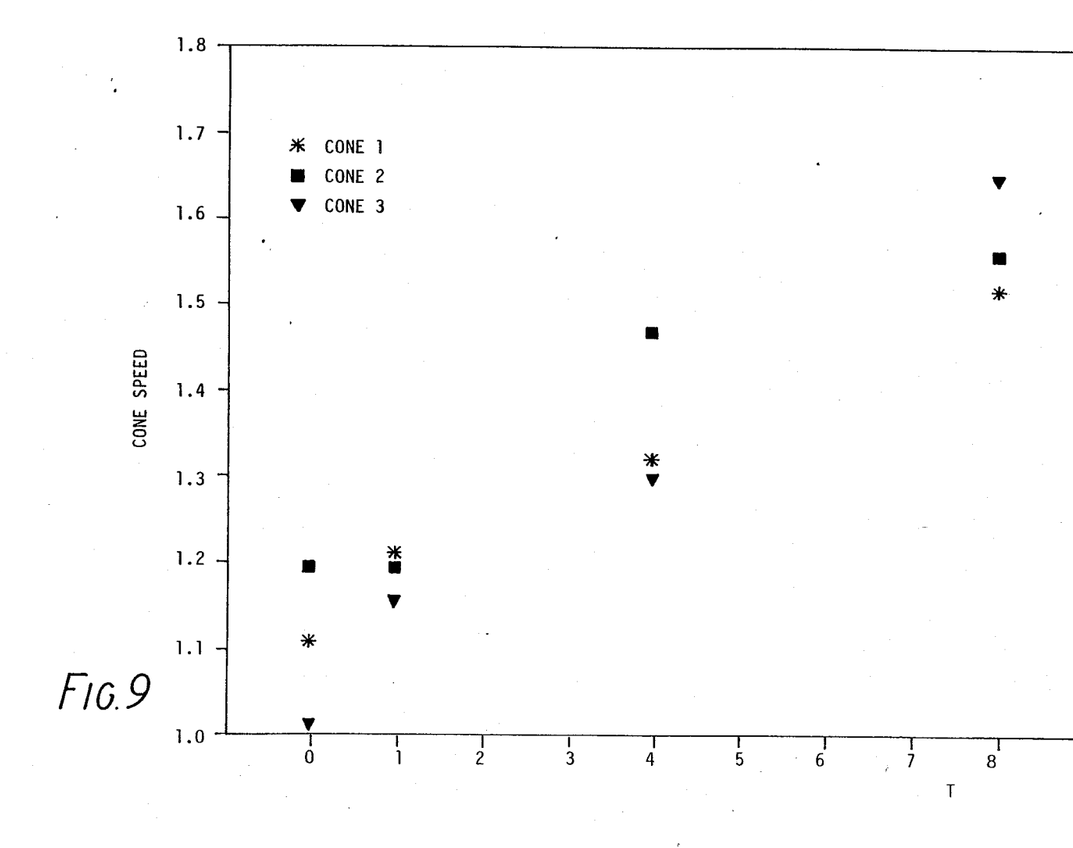
FIG. 9 is a plot showing the actual cone speeds measured with the drilling machine shown in FIG. 2, for various wear states.

FIG. 9 shows the actual cone speeds as a function of the state of wear T of a three-cone drill bit for the 3 cones. The actual cone speeds were measured by proximity detectors in the laboratory drilling machine. This figure indicates clearly that the cone speeds increase regularly when the cones wear from T0 to T8. This variation in the cone speeds provides therefore an indication of the state of wear of the bit.

The experimental data given previously relate to WOB measurement. However, the invention applies as well to TOR measurement. The above described method makes use of Fourier transforms to obtain frequency spectra. However other methods could be used for the same purpose, for example the method known as "Maximum Entropy Spectral Estimation".

I claim:

1. A method of determining the state of wear of a multicone drill bit fixed at the lower end of a drill string for drilling a borehole in the earth, according to which vibrations generated by the working drill bit are detected and converted into a time oscillatory signal from which a frequency spectrum is derived, characterized by extracting the periodicity of the frequency spectrum, determining from said periodicity the rate of rotation of at least one cone and deriving the state of wear of the drill bit from said rate of cone rotation.

2. A method according to claim 1, further including the step of normalizing the frequency spectrum relative to the rate of bit rotation.

3. A method according to claim 1, wherein said oscillatory signal represents the variation in amplitude of the vertical or torsional force applied to the drill bit.

4. A method according to claim 3, further comprising the steps of sensing the variation of the vertical and torsional forces applied to the drill bit so as to produce two oscillatory signals, generating the frequency spectra of the two signals and combining said spectra so as to produce a cross-spectrum.

5. A method according to claim 1, further including the step of removing from the frequency spectrum the frequency or frequencies generated by the pump injecting drilling mud into the drill string.

6. A method according to claim 5, wherein the mud pressure variations are detected and converted into a pressure signal from which a frequency spectrum is derived, the frequency or frequencies generated by the pump are identified and the frequency spectrum of the vibration oscillatory signal is filtered so as to remove said frequency or frequencies.

7. A method according to claim 1, wherein the frequency spectrum is the power spectrum.

8. A method according to claim 2, further comprising the steps of determining the range of possible rates of cone rotation relative to the rate of bit rotation, identifying the peak of highest amplitude in the frequency spectrum within said range and determining the rate of cone rotation from said peak position in the spectrum.

9. A method according to claim 2, further comprising the steps of giving prominence to a set of harmonics in the frequency spectrum by determining the fundamental frequency in the set of harmonics and by deriving the rate of cone rotation from said fundamental frequency.

10. A method according to claim 9, wherein the cepstrum of the frequency spectrum is computed, the peak of maximum amplitude is selected from the cepstrum and the rate of cone rotation is derived from the position of said peak in the cepstrum.

11. A method according to claim 9, wherein compressed spectra are obtained by compressing the frequency axis of the frequency spectrum by integer values, by multiplying the compressed spectra together so as to obtain an harmonic-enhanced spectrum, by determining the fundamental frequency of said harmonic-enhanced spectrum and by deriving the rate of cone rotation from said fundamental frequency.

* * * * *